United States Patent [19]

Suckow

[11] 4,407,348
[45] Oct. 4, 1983

[54] MULTI-PIECE WHEEL STRUCTURE

[75] Inventor: David S. Suckow, Decatur, Ill.

[73] Assignee: Caterpillar Tractor Co., Peoria, Ill.

[21] Appl. No.: 278,510

[22] PCT Filed: Jan. 23, 1981

[86] PCT No.: PCT/US81/00092
§ 371 Date: Jan. 23, 1981
§ 102(e) Date: Jan. 23, 1981

[51] Int. Cl.³ .................. B60B 25/08; B60B 25/18
[52] U.S. Cl. ..................... 152/410; 152/DIG. 10
[58] Field of Search ............... 152/396, 405–411, 152/DIG. 10, DIG. 17, 427

[56] References Cited

U.S. PATENT DOCUMENTS

| | | | |
|---|---|---|---|
| 2,822,021 | 2/1958 | Shipman et al. | 152/410 |
| 2,894,556 | 7/1959 | Darrow | 152/410 |
| 3,882,919 | 5/1975 | Sons et al. | 152/410 |
| 3,995,676 | 12/1976 | Casey | 152/410 |
| 4,021,077 | 5/1977 | Pringle | 301/13 |
| 4,049,320 | 9/1977 | DeRegnaucourt et al. | 301/13 |
| 4,116,489 | 9/1978 | Walther | 301/12 |

OTHER PUBLICATIONS

Goodyear Off-Highway Rim Cat. EM75-6086.

Primary Examiner—H. Grant Skaggs
Attorney, Agent, or Firm—Joseph W. Keen

[57] ABSTRACT

A multi-piece wheel structure (16) permits inflation of a tire (10) mounted thereon only when components constituting the wheel structure (16) are locked together. The wheel structure (16) includes an annular rim base (18) having an outer periphery (30) with an indentation (36), an annular restraining flange (22) arranged about the rim base (18) which prevents axial movement of the tire (10) mounted on the rim base (18), a locking ring (24) which is insertable in the indentation (36) between the restraining flange (22) and the rim base (18) and on one axial side of the restraining flange (22), a conduit structure (44,46) which extends through the rim base (18), at least one connection hole (52) in the rim base (18) connecting the conduit structure (44,46) to the indentation (36), and a sealing plug (26) located in the hole (52) in sealing engagement with the rim base (18) and properly assembled locking ring (24). If the locking ring (24) is improperly assembled in the indentation (36) the sealing plug (26) escapes from the connection hole (52), passes into the indentation (36), and permits escape of air from the tire's interior (10a).

9 Claims, 2 Drawing Figures

MULTI-PIECE WHEEL STRUCTURE

DESCRIPTION

TECHNICAL FIELD

This invention relates generally to multi-piece wheel structures and, more particularly, to means for preventing inflation of a tire mounted thereon when the wheel structure is improperly assembled.

BACKGROUND ART

Large wheels used on vehicles such as earthmoving apparatus are typically of multi-piece construction which permit tires to be mounted thereon and locked into sealing engagement therewith without deforming the tires' inner edges or beads over protruding rims which are commonly found in automobile applications. The beads of tubeless tires mounted on such multi-piece wheel structures are axially restrained on one side by a restraining flange which is typically integral with a rim base which is radially adjacent one bead and on a second side by a second rstraining flange which is normally held in place by a bead seat band which is mounted radially between the rim base and the remaining tire bead. The bead seat band and the second flange are locked to the rim base by various means with means being provided for sealing between the bead seat band and the rim base so as to permit tire inflation. Other wheel structures exist in which the second restraining flange is integral with the bead seat band. Such structures also include a device for locking the flange and bead seat band into a desired configuration with the rim base as well as a seal which prevents air leakage between the bead seat band and rim base. Judicious disposition of the seal such that it is engaged by the locking device only when the locking device is properly assembled provides an indication of an improperly assembled locking device by preventing inflation of a tire mounted on such rim base. Such initial refusal to inflate is preferable to tire inflation at the time of mounting and tire deflation at a time subsequent thereto since suitable inflation equipment and/or wheel structure assemblying apparatus may not be as readily available when the utilizing vehicle is operating under service conditions as when the tire is initially mounted.

Other examples of wheel structures which prevent tire inflation when improperly assembled include U.S. Pat. Nos. 2,822,021 and 2,894,556 which respectively issued Feb. 4, 1958 and July 14, 1959. The aforementioned wheel structures include at least three components (restraining flange, bead seat band, and locking ring) in addition to the seal. Assembly of such multiple components with a tire mounted on a rim base necessitates simultaneous manipulation of those components into a desired, cooperative configuration in which the components are interlocked. The difficulty in manipulating the multiple components into such desired configuration increases rapidly with the number of components to-be-assembled. An example of a rim base structure assembled with one component is illustrated in a Goodyear Off-Highway Rim catalog whose number is EM75-6086. The rim type LW-LWD is illustrative of such structure and includes an integral restraining flange, locking ring, and bead seat band. For heavy construction vehicles a substantial upsetting moment tending to rotate the restraining flange about its surface of securement with the rim base or bead seat band can result from excessive air pressure in the tire and impact loading of such tire. Extension of the restraining flange under the mounted tire's adjacent bead provides a degree of resistance to such upsetting moment exerted by the mounted tire. However, under extreme conditions, additional axial support for the restraining flange is desirable.

Additional axial support of the restraining flange at a radial location beyond the mounted tire's inner edge is illustrated in U.S. Pat. No. 4,021,077 which issued May 3, 1977, U.S. Pat. No. 4,116,489 which issued Sept. 26, 1978, and U.S. Pat. No. 4,049,320 which issued Sept. 20, 1977. None of the aforementioned wheel structures illustrate any sealing means to prevent air leakage from a mounted tire's interior along the rim base since the tire's bead acts as its own seal against the rim base and cooperating lock ring. Moreover, such structures do not have provisions for preventing tire inflation when the locking ring is improperly assembled. U.S. Pat. No. 3,882,919 which issued May 13, 1975, illustrates a wheel structure which prevents tire inflation unless a locking device secures the restraining flange and bead seat band in proper configuration. While the performance of such wheel structure is admirable, the several components used therein are relatively expensive and present significant difficulty in simultaneous manipulation thereof during tire mounting and removal.

The present invention is directed toward providing a minimum number of wheel components which must be manipulated into a desired configuration during tire installation, provide structure to those components which provides high resistivity to upsetting moments exerted by the tire on the restraining flange, and supply means which cooperate with such components to prevent tire inflation when those components are improperly assembled.

DISCLOSURE OF THE INVENTION

In one aspect of the present invention a wheel structure is provided which is highly resistive to upsetting moments and which permits inflation of a tire mounted thereon only when components thereof are assembled in a locked configuration. In addition to an annular rim base on which a tire is mountable, the wheel structure includes an annular restraining flange which is disposed about the rim base in axial engagement with the tire, a locking ring which is receivable in an indentation in the rim base's outer periphery and is engageable with the restraining flange on the opposite axial side thereof as the tire, means for inflating a tire mounted on the rim base, and means for permitting escape of inflation air at the locking ring's indentation only when the locking ring is not properly arranged in the indentation.

BRIEF DESCRIPTION OF THE DRAWINGS

The invention will be more fully understood from the following detailed description of the preferred embodiment, taken in connection with the accompanying drawings, in which.

BEST MODE FOR CARRYING OUT THE INVENTION

Figure 1:
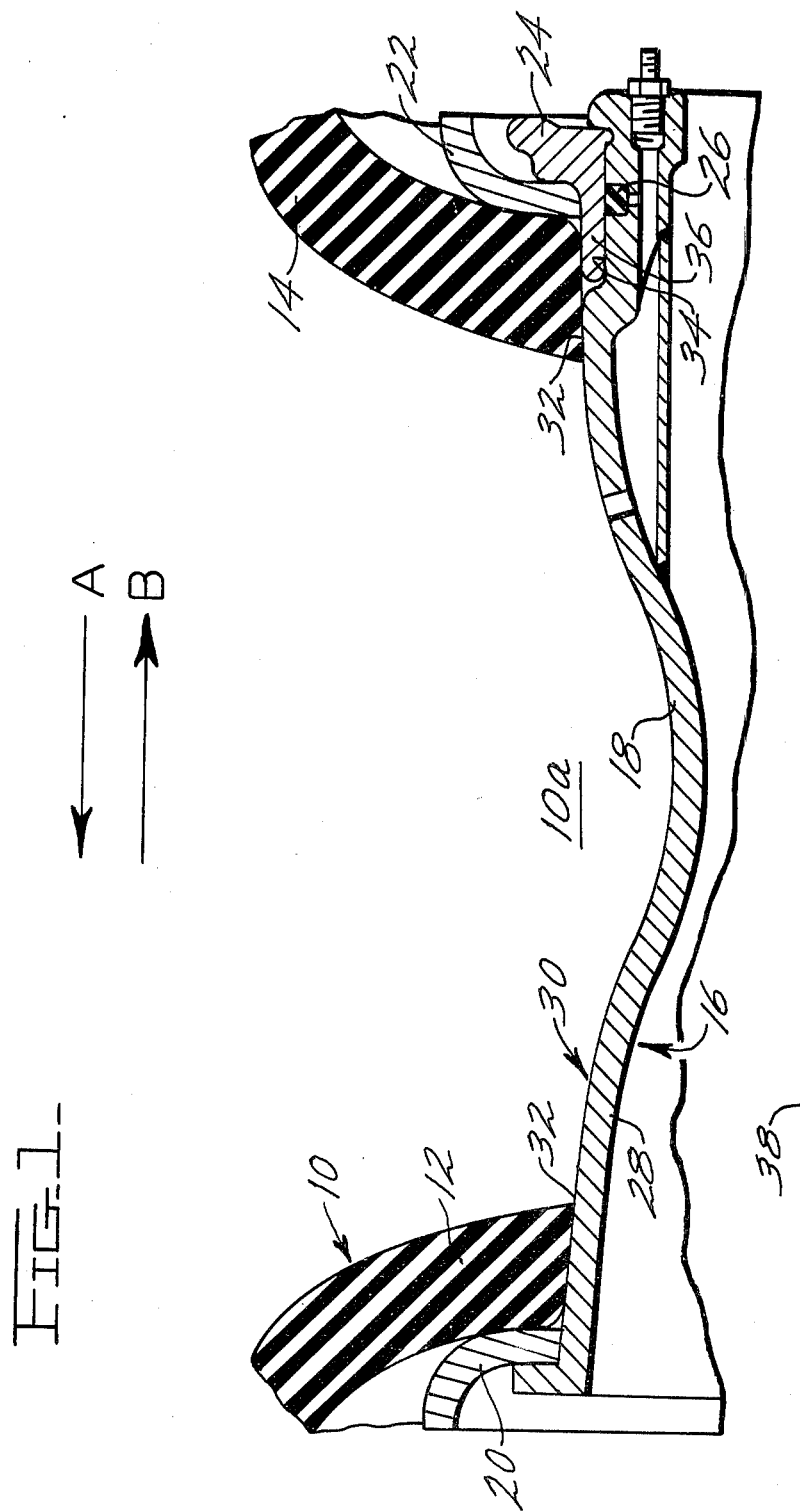
FIG. 1 is a radial sectional view through a tire and the present invention wheel structure on which the tire is mounted.

Referring now to the drawings in detail a tire 10 (only a portion of which is shown) having an interior 10a also has beads 12 and 14 which are mounted and axially restrained by the present invention wheel structure 16. An annular rim base 18 arranged about an axis of rotation 19, a first and a second bead restraining flange 20 and 22 respectively, an annular split locking ring 24, and an air sealing plug 26 together constitute the wheel structure 16. The rim base 18 includes an inner periphery 28, an outer periphery 30, and an axial periphery 31. The outer periphery 30 has a tire mounting surface 32 and a locking surface 34 which bounds a locking indentation 36 which is radially nearer the axis of rotation 19 than the mounting surface 32. The annular locking ring 24 includes a stabilizing portion 40 and a securing portion 42. The stabilizing portion 40 is disposable within the locking indentation 36 radially inside and engageable with the tire bead 14 and the restraining flange 22 while the securing portion 42 extends generally radially outwardly beyond the outline of the tire mounting surface 32 in axially abutting relationship with the restraining flange 22. The stabilizing portion 40 has an outer periphery securing surface 40a and an inner periphery stopping surface 40b. The outer periphery 40a is in general alignment with the tire mounting surface 32 such that axial extension of the mounting surface 32 becomes coincident with the outer periphery 40a. The stopping surface 40b is engageable with the locking surface 34 and the air plug 26 when the locking ring 24 is disposed in its operational, locked position as illustrated in FIGS. 1 and 2.

Means for providing fluid communication from the atmosphere to the tire's interior 10a constitutes an inflation opening 44 extending through the rim base structure 18 from its inner 28 to its outer 30 periphery and a conduit structure 46 extending axially from the inflation opening 44. A partition 48 is welded or otherwise affixed to the inner periphery 28 of the rim base 18 to form an air plenum 49 which constitutes a portion of the conduit 46. An axial air opening 50 which also constitutes a portion of the conduit 46 extends through the rim base 18 from the inner periphery 28 to the axial periphery 31 thereof so as to provide fluid communication between the air plenum 49 and the atmosphere. A valve stem 51 having an inflation port 51a which constitutes a part of the conduit 46 is typically installed in the air opening 50 to regulate air transmission therethrough such as during inflation of the tire 10. The valve stem 51 may be replaced, subsequent to tire inflation, by a suitable, air tight plug threaded or otherwise securely disposed in the air opening 50. A least one relief hole 52 extends between the air opening 50 and the locking surface 34 and has a first portion 52a which intersects the locking surface 34 and a second portion 52b adjacent thereto and of smaller cross sectional area than the first hole portion 52a. The air plug is operationally resident in the hole portion 52a in sealing contact with the rim base 18 bounding the hole portion 52a and preferably constitutes a soft elastomeric material.

Either the air opening 50 or the inflation port 51a preferably has a cross sectional flow area located fluidly between the hole portion 52b and the atmosphere which is smaller than the flow area of the hole portion 52b. While the illustrated embodiment's smaller cross sectional flow area is located in the inflation port 52a of the conduit 46, it is to be understood that a portion of the air opening 50 through which air is transmissible could have the aforementioned smaller air flow area rather than the inflation port 51a.

Figure 2:
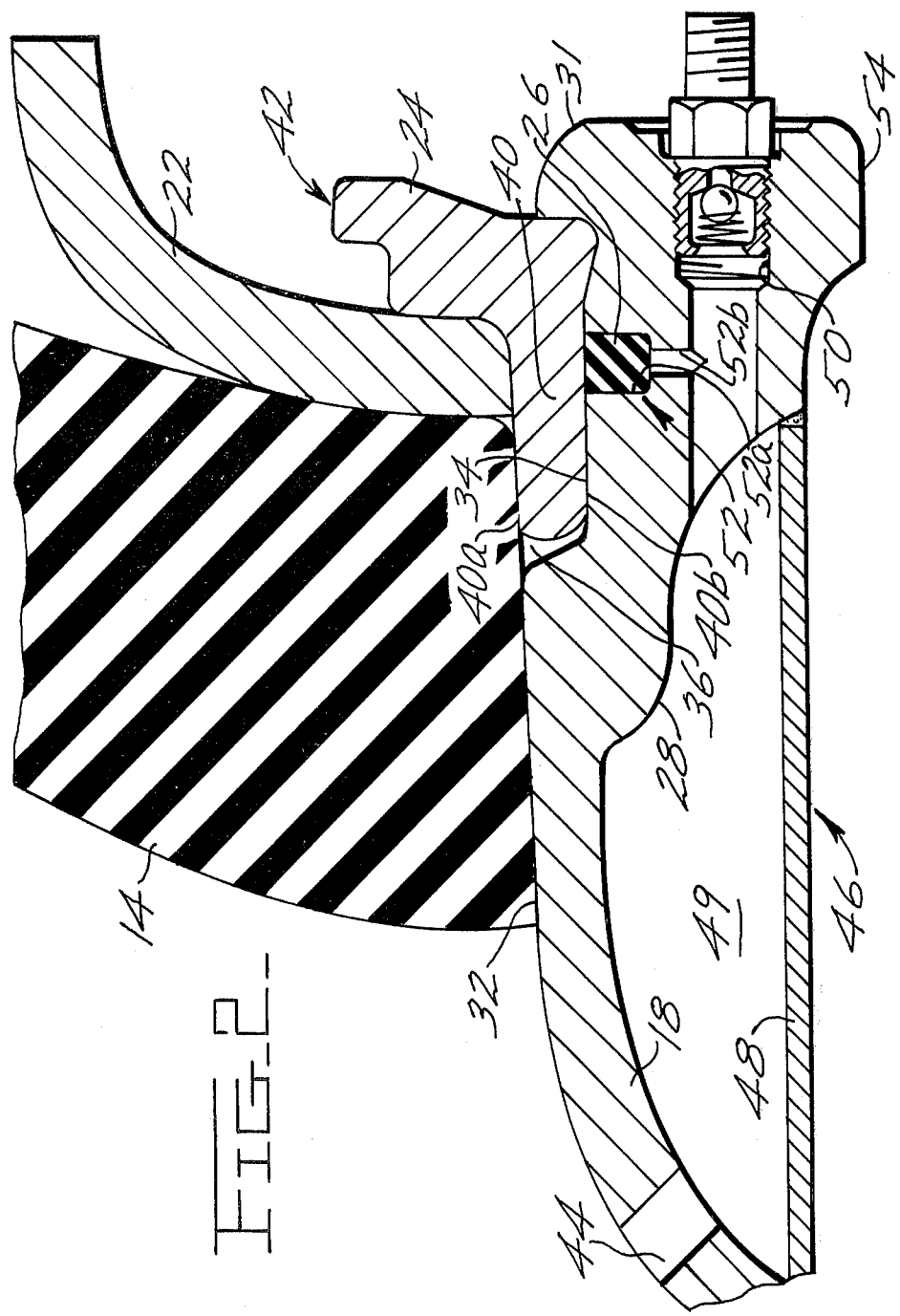
FIG. 2 is an enlarged fragmentary view showing the right side only of the wheel structure of FIG. 1.

Although only a single relief hole 52 is illustrated in FIG. 2, it is to be understood that a plurality of such relief holes 52 may be provided when used in combination with a lock ring 24 of extended length or diminished stiffness. In the illustrated embodiment the air plenum 49, air opening 50, and inflation port 51a cooperate to form the conduit 46 since the illustrated wheel structure 16 is used in an application in which the driving force on the wheel is transmitted thereto through a flange member (not shown) disposed radially within a locating surface 54 on the inner periphery 28 of the rim base 18. It is to be further understood, however, that the conduit 46 could be replaced by an air inlet stem (not shown) which is fluidly connected to the hole 52 or another, similar passage extending between the air inlet stem and the locking surface 34. Use of a differently configured final drive mechanism than that described heretofore enables use of such air inlet stems.

Industrial Applicability

Prior to mounting the tire 10 on the wheel structure 16, the tire bead restraining flange 22 and the split locking ring 24 are removed from the rim base 18. The tire 10 is then axially displaced in a direction A as indicated in FIG. 1 relative to the rim base 18 until the bead 12 engages the bead restraining flange 20 and the mounting surface 32. The tire bead 14 is then further displaced by an external deformation force in the axial direction A until it is disposed to the left of the indentation 36. The bead restraining flange 22 and the locking ring 24 are cooperatively arranged in the configuration illustrated in FIGS. 1 and 2 in which the stabilizing portion 40 of the split locking ring 24 is disposed in the indentation 36 such that the sealing surface 40b is engaged with the locking surface 34. Subsequent to properly disposing the locking ring 24 into the indentation 36, the tire bead 14 is permitted to move to the right in a direction generally indicated by B. Rightward movement B of the tire bead 14 occurs when the external deformation force is removed and the bead 14 returns toward an unstressed, undeformed configuration. When the tire bead 14 reaches the configuration illustrated in FIGS. 1 and 2, further movement thereof in the direction B is obstructed by the restraining flange 22 which, in turn, is secured in the illustrated position by the securing portion 42 of the split locking ring 24.

In the illustrated, locked wheel structure configuration the tire bead 14 is engaged with the restraining flange 22, the rim base 18 along the mounting surface 32, and the locking ring's securing surface 40a. To inflate the tire 10 to a desired pressure a source of compressed air or other fluid is transmitted through the inflation port 51a, the air opening 50, the air plenum 49, and the inflation opening 44 to the tire interior 10a. Additionally, air transmitted through the inflation port 51a and air opening 50 passes into the relief hole 52 where it contacts the air plug 26 and tends to drive it radially outwardly. If the locking ring 24 is properly disposed in its locked configuration where its stopping surface 40b is in engagement with the locking surface 34 and the air plug 26, such outward movement of the air plug 26 is obstructed by the locking ring 24 and the tire 10 is allowed to inflate. Although in the illustrated locked configuration, the air plug 26 is coextensive with the hole portion 52a, it is to be understood that accumulation of tolerances of the wheel structure's components may permit the air plug 26 to extend beyond the locking surface 34 into the indentation 36 where it is engaged by the locking ring 24. In such case, the locking ring 24 will be engageable with the locking surface 34 at other arcuate location(s) and the air plug 26 will remain sealed against the rim base 18 so as to permit tire inflation.

If, however, the locking ring 24 is not properly disposed in its locked configuration where its stopping surface 40b is engaged by the locking surface 34 and the air plug 26, the air plug 26 will extrude into a part of the locking indentation 36 which the locking ring 24 does not occupy. In such case air supplied through the inflation port 51a will pass through the air opening 50, through the hole 52, through the indentation 36 and back to atmosphere so as to prevent the inflation of the tire 10. Pressure increases in the tire 10 are avoided when the locking ring 24 is improperly disposed by cooperatively sizing the minimum cross sectional areas of the conduit 46 and the relief hole 52 as hereinbefore described. By providing a relief hole 52 whose minimum flow area is at least as large as the minimum flow area of the conduit 46 between the relief hole 52 and the atmosphere, air supplied through the conduit 46 can be transmitted through the relief hole 52 with the same velocity.

The inability to inflate the tire 10 is an indication of improper disposition of the locking ring 24 in its locking indentation 36. Such noninflatability provides a signal to inspect the locking ring 24 until the disengaged portion(s) thereof are found and forced into the locking indentation 36. A tire's refusal to inflate after it has been mounted on the wheel 16 as a result of improper disposition of the locking ring 24 is preferable to permitting initial inflation of the tire 10 regardless of the locking ring's disposition and then sustaining a rapid deflation at a subsequent time. Such postponed deflation is to be avoided since it may occur under unfavorable circumstances which do not lend themselves to the repair and/or reassembly of the wheel structure 16 and tire 10. Due to the engagement between the tire bead 14 and the securing surface 40a as well as the radial extension of the locking ring's restraining portion 42 which engages the restraining flange 22, upsetting moments exerted by the tire bead 14 on the restraining flange 22 are effectively resisted.

It should now be apparent that an improved wheel structure 16 having fewer components parts with improved resistance to tire induced upsetting moments has been provided. The instant wheel structure 16 also includes provisions for preventing inflation of a tire mounted thereon when the locking ring 24 is improperly disposed in the locking indentation 36. Sealing disposition of the air plug 26 in one component 18 of the wheel structure 16 rather than between cooperating components simplifies the procedure for mounting the tire 10 and avoids problems associated with improperly assembling a seal therebetween.

I claim:

1. A wheel structure (16) for a tire (10) comprising:
   an annular rim base (18) disposed about a longitudinal axis (19) and having an inner periphery (28) and an outer periphery (39), said outer periphery (30) including a tire mounting surface (32) which is engageable with both beads of a tire and a locking surface (34), said locking surface (34) bounding a locking indentation (36) and being disposed radially nearer said longitudinal axis (19) than said mounting surface (32);
   an annular restraining flange (22) disposed about said rim base (18);
   a locking ring (24) which is receivable in said locking indentation (36) and is engageable with said locking surface (34) and said restraining flange (22) to prevent axial movement of said restraining flange (22) in a first direction (B);
   first means (44,46) for providing fluid communication between the atmosphere and a tire's interior (10a) when a tire (10) is mounted on said tire mounting surface (32);
   second means (52) for providing fluid communication between said first fluid communication means (44,46) and said locking surface (34); and
   means (26) for obstructing fluid communication through said second fluid communication means (52) when said locking ring (24) is engaged with said locking surface (34).

2. The wheel structure (16) of claim 1, said first fluid communication means (44,46) comprising:
   an opening (44) through said rim base (18) from said inner periphery (28) to said outer periphery (30); and
   a conduit (46) extending axially from said rim base opening (44) in said first direction (B).

3. The wheel structure (16) of claim 2, said second fluid communication means (52) comprising:
   at least one hole (52) extending through said rim base (18) from said conduit (46) to said locking surface (34), said hole (52) being defined by a bounding surface.

4. The wheel structure (16) of claim 3 wherein said hole (52) has a cross sectional flow area at least as large as the minimum cross sectional flow area of said conduit (46).

5. The wheel structure (16) of claim 3, said fluid communication obstructing means (26) comprising:
   an elastomeric plug (26) engageable with said locking ring (24) is disposed in said hole (52) in sealing contact with the bounding surface of said hole (52).

6. The wheel structure (16) of claim 3, wherein said hole (52) has a first and a second portion (52a,52b) each of which is characterized by a predetermined cross section, said first hole portion (52a) intersecting said locking surface (34) and having a larger cross section than said second hole portion (52b) adjacent thereto.

7. The wheel structure (16) of claim 6, said fluid communication obstructing means (26) comprising:
   an elastomeric plug (26) disposed in said first hole portion (52a) which intersects said locking surface (34).

8. The wheel structure (16) of claim 3 wherein said holes (52) are uniformly spaced in an arcuate direction about said longitudinal axis (38).

9. The wheel structure (16) of claim 8 wherein each of said holes (52) extends in a radial direction relative to said longitudinal axis (19).

* * * * *